US007797419B2

(12) United States Patent
Bhattacharya et al.

(10) Patent No.: US 7,797,419 B2
(45) Date of Patent: *Sep. 14, 2010

(54) METHOD OF DETERMINING INTRA-SESSION EVENT CORRELATION ACROSS NETWORK ADDRESS TRANSLATION DEVICES

(75) Inventors: Partha Bhattacharya, Cupertino, CA (US); Yu Liao, San Jose, CA (US)

(73) Assignee: Protego Networks, Inc., Milpitas, CA (US)

( * ) Notice: Subject to any disclaimer, the term of this patent is extended or adjusted under 35 U.S.C. 154(b) by 695 days.

This patent is subject to a terminal disclaimer.

(21) Appl. No.: 11/264,286

(22) Filed: Oct. 31, 2005

(65) Prior Publication Data
US 2006/0095587 A1    May 4, 2006

Related U.S. Application Data

(63) Continuation of application No. 10/602,846, filed on Jun. 23, 2003, now Pat. No. 6,985,920.

(51) Int. Cl.
G06F 15/173 (2006.01)
(52) U.S. Cl. ................ 709/224; 709/220; 709/223; 709/227; 709/230
(58) Field of Classification Search ............. 709/220, 709/223, 227, 230, 224
See application file for complete search history.

(56) References Cited

U.S. PATENT DOCUMENTS 5,566,339 A   10/1996  Perholtz et al.

| 5,929,855 A | 7/1999 | Benton et al. |
| 6,233,575 B1 | 5/2001 | Agrawal et al. |
| 6,502,133 B1 | 12/2002 | Baulier et al. |
| 6,505,192 B1 | 1/2003 | Godwin et al. |
| 6,550,012 B1 | 4/2003 | Villa et al. |

(Continued)

FOREIGN PATENT DOCUMENTS

JP    2002/261788 A    9/2002

(Continued)

OTHER PUBLICATIONS

International Searching Authority, "Notification of Transmittal of the International Search Report and the Written Opinion of the International Searching Authority, or the Declaration," PCT/US04/29185, mailed on Dec. 26, 2005, 8 pages.

(Continued)

Primary Examiner—Thu Nguyen
Assistant Examiner—Lan-Dai T Truong
(74) Attorney, Agent, or Firm—Hickman Palermo Truong & Becker LLP

(57) ABSTRACT

An intra-session network correlation system receives a stream of network events and groups the events into different network sessions according to event parameters and corresponding network address translation (NAT) information. An event in the stream is first matched against any existing session, and then categorized using the information about a NAT device that translates a message to which the event is related. Finally, at a predefined time, a categorized event is processed to identify other categorized events in accordance with a NAT message or an expiry timer associated with the categorized event; the categorized event and identified other categorized events are grouped into the same network session.

15 Claims, 14 Drawing Sheets

U.S. PATENT DOCUMENTS

| | | |
|---|---|---|
| 6,647,400 B1 | 11/2003 | Moran |
| 6,717,949 B1 * | 4/2004 | Boden et al. ................ 370/401 |
| 6,728,885 B1 | 4/2004 | Taylor et al. |
| 6,795,918 B1 | 9/2004 | Trolan |
| 6,816,455 B2 | 11/2004 | Goldberg et al. |
| 6,826,697 B1 | 11/2004 | Moran |
| 6,829,239 B1 * | 12/2004 | Bhatia et al. ................ 370/392 |
| 6,883,162 B2 | 4/2005 | Jackson et al. |
| 6,886,102 B1 | 4/2005 | Lyle |
| 6,920,453 B2 | 7/2005 | Mannila et al. |
| 7,143,442 B2 * | 11/2006 | Scarfe et al. ................. 726/23 |
| 7,171,689 B2 | 1/2007 | Beavers |
| 7,246,166 B1 * | 7/2007 | Watson ...................... 709/227 |
| 7,299,504 B1 | 11/2007 | Tiller et al. |
| 7,478,151 B1 | 1/2009 | Maiocco et al. |
| 7,627,544 B2 | 12/2009 | Chkodrov et al. |
| 2002/0019945 A1 | 2/2002 | Houston et al. |
| 2002/0053033 A1 | 5/2002 | Cooper et al. |
| 2002/0199024 A1 | 12/2002 | Givoly et al. |
| 2003/0009547 A1 | 1/2003 | Benfield et al. |
| 2003/0033402 A1 | 2/2003 | Battat et al. |
| 2003/0120935 A1 | 6/2003 | Teal et al. |
| 2003/0130967 A1 | 7/2003 | Mannila et al. |
| 2003/0149727 A1 | 8/2003 | Jaschek et al. |
| 2003/0165121 A1 | 9/2003 | Leung et al. |
| 2003/0182580 A1 | 9/2003 | Lee |
| 2003/0200192 A1 | 10/2003 | Bell et al. |
| 2003/0200318 A1 | 10/2003 | Chen et al. |
| 2003/0236995 A1 | 12/2003 | Fretwell |
| 2004/0015783 A1 | 1/2004 | Lennon et al. |
| 2004/0049698 A1 | 3/2004 | Ott et al. |
| 2004/0073800 A1 * | 4/2004 | Shah et al. ................... 713/176 |
| 2004/0098623 A1 | 5/2004 | Scheidell |
| 2004/0100976 A1 * | 5/2004 | Chang et al. ................ 370/401 |
| 2004/0103021 A1 | 5/2004 | Scarfe et al. |
| 2004/0111637 A1 | 6/2004 | Baffes et al. |
| 2004/0250112 A1 | 12/2004 | Valente et al. |
| 2005/0005017 A1 | 1/2005 | Ptacek et al. |
| 2005/0021740 A1 * | 1/2005 | Bar et al. ..................... 709/224 |
| 2005/0037733 A1 | 2/2005 | Coleman et al. |
| 2005/0044406 A1 | 2/2005 | Stute |
| 2006/0089985 A1 | 4/2006 | Poletto |
| 2006/0218640 A1 * | 9/2006 | Lotem et al. ................... 726/25 |
| 2006/0242694 A1 | 10/2006 | Gold et al. |
| 2007/0086480 A1 * | 4/2007 | Elzur ........................ 370/463 |
| 2007/0156656 A1 | 7/2007 | Pather et al. |
| 2008/0046572 A1 * | 2/2008 | Jagels ........................ 709/227 |

FOREIGN PATENT DOCUMENTS

| | | | |
|---|---|---|---|
| WO | WO 02/25402 | * | 3/2002 |

OTHER PUBLICATIONS

Current Claims, PCT/US04/29185, 8 pages.

Helmer, Guy G. et al., "Intelligent Agents for Intrusion Detection," Iowa State University, Ames Iowa 50011, 4 pages.

Lam, Kwok-Yan et al., "Multivariate Data Analysis Software for Enhancing System Security," Journal of Systems Software, Dec. 1995, vol. 31, Issue 3, pp. 267-275.

Ning, Peng et al., "Abstraction-Based Intrusion Detection in Distributed Environments," 2001, ACM Transactions on Information and System Security (TISSEC), vol. 4, Issue 4, pp. 407-452.

* cited by examiner

NAT Lookup

DNST

NAT Lookup

DNST

NAT Lookup

DNST

DNST

METHOD OF DETERMINING INTRA-SESSION EVENT CORRELATION ACROSS NETWORK ADDRESS TRANSLATION DEVICES

PRIORITY CLAIM; CROSS-REFERENCE TO RELATED APPLICATION

This application claims priority under 35 U.S.C. §120 as a Continuation of prior U.S. application Ser. No. 10/602,846, filed Jun. 23, 2003 now U.S. Pat. No. 6,985,920, the entire contents of which is hereby incorporated by reference as if fully set forth herein.

FIELD OF THE INVENTION

The present invention relates generally to the field of computer network security, and in particular to systems and methods for grouping network events in a computer network containing various network address translation devices into different network sessions.

BACKGROUND OF THE INVENTION

Network address translation (NAT) devices translate the addresses and ports for network packets destined to or originating from internal hosts and servers within a local area network (LAN).

NAT provides at least two significant benefits for a LAN's operation. First, NAT can hide the true address of an internal host from the outside world. This is very important for the purpose of protecting the internal host from security attacks. For example, if an attacker does not know the true address of a device on a LAN, because packets from the device are mapped by a NAT device so as to hide the device's true address, it is difficult for the attacker to launch an effective attack against that device.

Second, NAT allows a LAN to use many more private addresses for internal use than the number of public addresses it owns. This feature has significantly relieved the problem of limited address capacity offered by 32 bit addresses. For instance, multiple LANs can share the same group of private network addresses for their internal use as long as they have unique public addresses. As a result, private addresses are used within a LAN between internal hosts and public addresses are used for communication across the Internet.

However, the usage of NAT provides a challenge for early detection of network security attacks. Current security devices such as firewalls, virtual private network (VPN) gateways, intrusion detection systems (IDS) generate events/alarms upon detecting a security attack. An event message typically contains the network addresses of the suspected intruder and the attacked host as well as the target TCP/IP application, e.g. HTTP or FTP, on the attacked host. Correlation of a stream of events from different security devices, all relating to messages between the same suspected intruder and the same host helps to detect an attack as early as possible.

As shown in FIG. 1, in order to quickly detect a security attack against a computer network, multiple security devices are deployed over the Internet. Each security device is configured such that whenever it detects a suspicious event, e.g., an IP packet, it sends an event message to a network security monitor. The network security monitor is responsible for correlating diverse events from different parts of the network and providing insights into higher-level attack scenarios.

Because of NAT, events from different devices may have different addresses for a single suspected intruder or a single attacked host, which makes it difficult to correlate these events. As a result, a direct analysis of a stream of events from different security devices may not appropriately reveal the existence of a security attack.

Therefore, it would be desirable to develop a method and system that can recognize that a stream of network events from different security devices were all generated in response to a message from a source to a destination, even though these events may have different source and destination information due to NAT operations performed on the message as it moves through the network.

SUMMARY OF THE INVENTION

A method and system correlate network events having different source and destination information into the same network session using the network address translation information of various NAT devices along a network transmission path over a computer network.

An incoming network event with a set of event parameters is first evaluated to determine if it belongs to a network session associated with any previously received network event or events. If there is a match, the incoming event will be categorized into the same session as those previously received event or events.

Second, the network event is compared against a group of NAT devices, each device having a set of predefined network address translation rules. If the event is associated with a NAT rule, the corresponding NAT device may be part of a network transmission path from which the event is reported.

Furthermore, starting from the corresponding NAT device and rule, more possible events in association with the incoming event are estimated. These possible events, if any, are then evaluated to see if they belong to any existing network session.

Finally, at a predefined time, a previously received network event is further processed using its network session or network address translation information to identify more events belonging to the same network session, if any, and such network events are grouped together, given a unique identifier, and sent to a network security monitoring device to detect the existence of any possible network attack.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

DESCRIPTION OF EMBODIMENTS

For network attack detection, it would be beneficial to group diverse events into a "network session" established along a transmission path over the network between a source address and a destination address. However, the existence of NAT devices along the same transmission path makes this difficult because events from different security devices may have different pairs of source and destination addresses due to various network address translations along the transmission path.

For each parameter of an event, a NAT rule defines a mapping relationship from a pre-mapping domain to a post-mapping domain. A NAT rule is called static if there is a one-to-one mapping between the two domains or dynamic if there is a many-to-one mapping between the two domains. A first dynamic NAT rule is considered to be ambiguous with respect to a particular event if there is a second dynamic NAT rule where the first and second rules are both eligible to perform a mapping operation on the same parameter of the event's session qualifier (source address, source port, destination address, destination port, protocol). From another perspective, if the path of a message through a network is unknown (or partially unknown) because the path could be through any one of a plurality of NAT devices, then the NAT rules of those devices will be considered to be ambiguous with respect to events generated for that message. If a dynamic NAT rule is not ambiguous with respect to an event, then it is called an unambiguous dynamic NAT rule.

Figure 1:
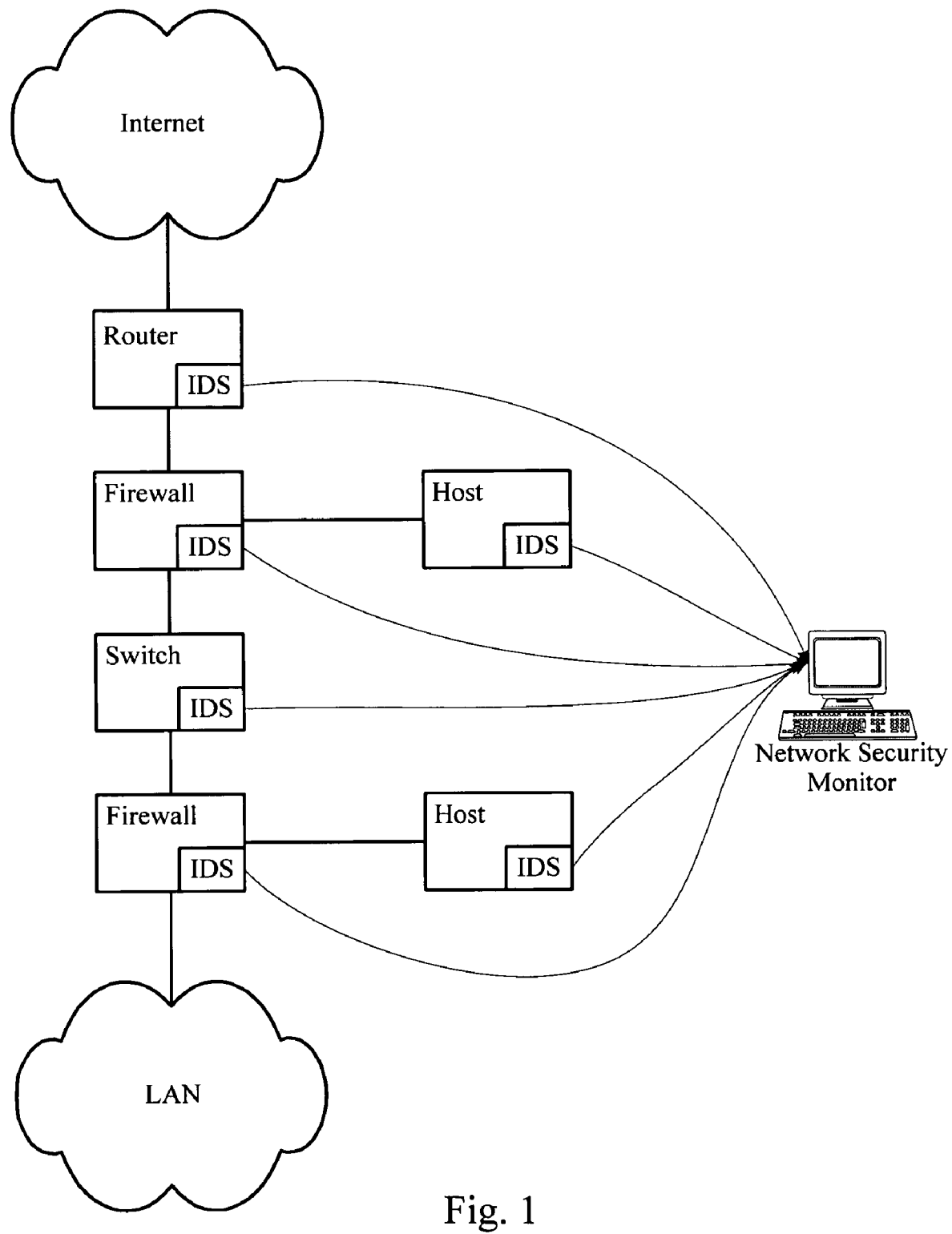
FIG. 1 illustrates a computer network configured to enable collection of event messages from multiple security devices by a network security monitor.
Figure 2:
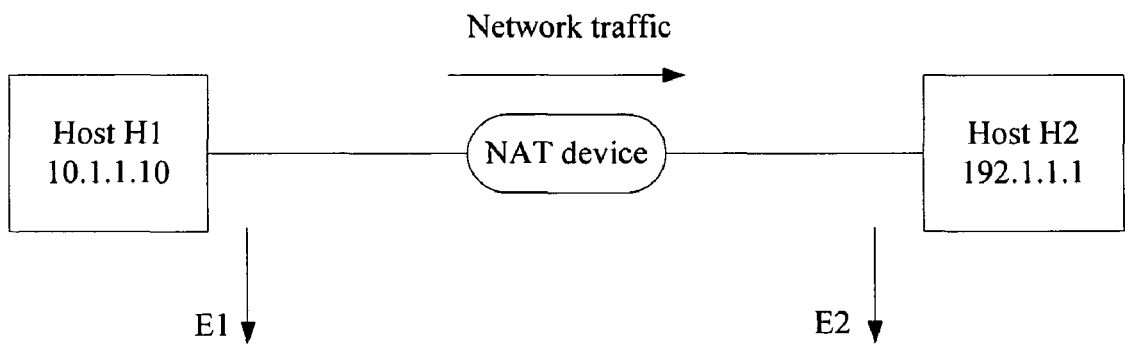
FIG. 2 illustrates a source dynamic and destination static NAT rule.

FIG. 2 shows an example of a dynamic NAT rule that performs a many-to-one mapping of the source address and a static (i.e., one-to-one) mapping of the destination address. There are two event parameters, source address and destination address, mapped from the pre-mapping domain to the post-mapping domain of the NAT rule. According to the NAT rule, any IP packet with source address ranging from 10.1.1.0 to 10.1.1.255 and a destination address of 100.1.1.1 will be converted into a new packet with a source address of 20.1.1.1 and a destination address of 192.1.1.1. This NAT rule can be used to determine that two events, one from each side of the NAT device, belong to the same network session.

In FIG. 2, a security device (not shown) generates a network event E1 before NAT transformation. E1 has a session qualifier SQ1. A session qualifier comprises the event parameters that characterize a network session, e.g., source address, destination address, source port, destination port, and protocol. Session qualifier SQ1's source address is 10.1.1.10, which is between 10.1.1.0 and 10.1.1.255, and its destination address is 100.1.1.1. Given SQ1 and the NAT rule, it is very easy to predict a session qualifier SQ2 after NAT transformation, that is a source address of 20.1.1.1 and a destination address of 192.1.1.1. Therefore, if an event E2 corresponding to the same session as E1 is received after NAT transformation, it will be characterized by a different session qualifier SQ2. In other words, even though SQ1 and SQ2 are different, they actually characterize the same network session. The present invention provides a method and system for correlating a stream of events having different session qualifiers into the same network session using relevant NAT information.

Figure 3:
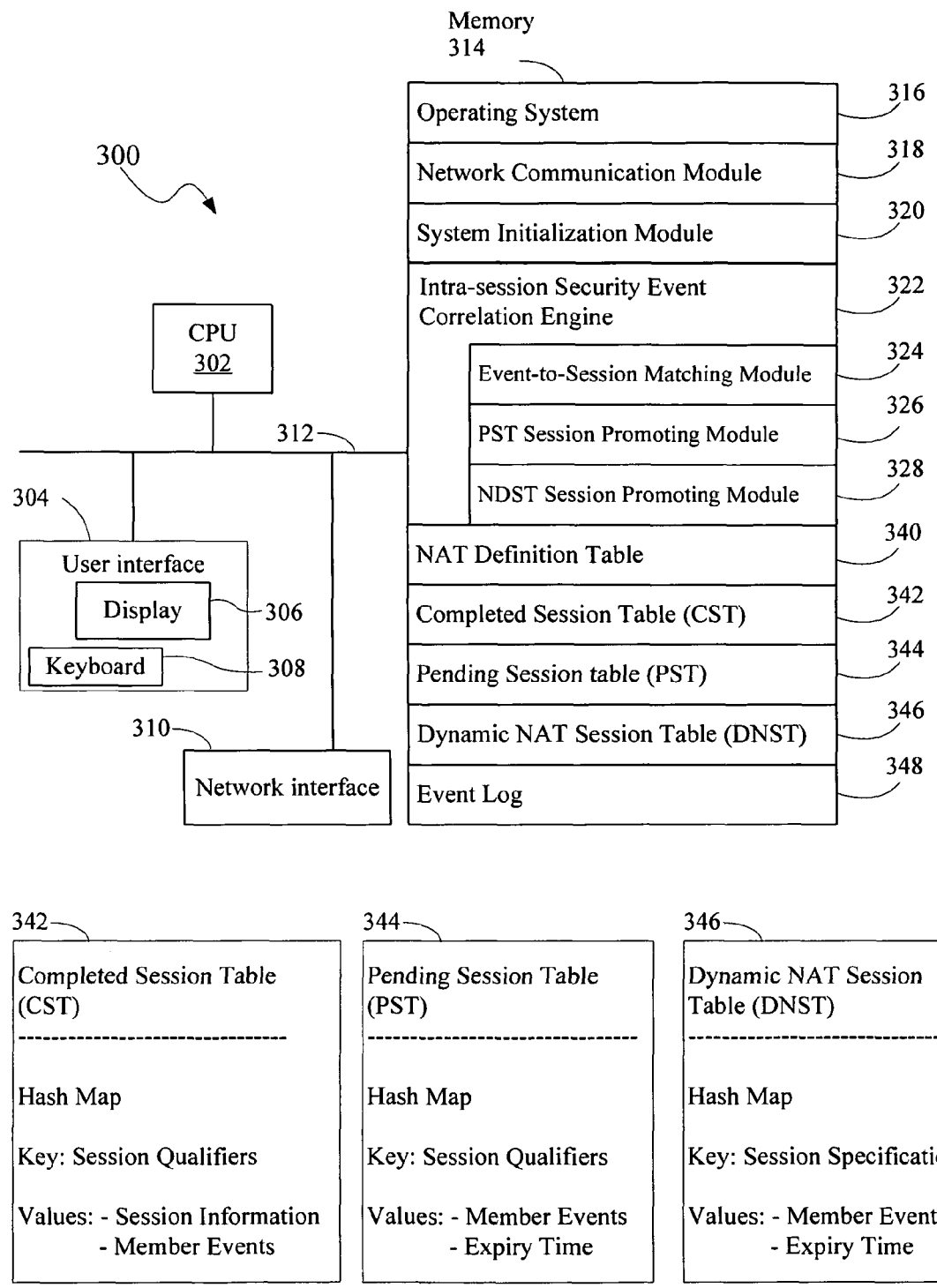
FIG. 3 is a block diagram of an intra-session event correlation system.

FIG. 3 illustrates an intra-session event correlation system 300 in accordance with the present invention. An intra-session event correlation system 300 typically comprises one or more central processing units (CPU's) 302, one or more network or other communications interfaces 310, memory 314, and one or more communication buses 312 for interconnecting the various components of system 300. Intra-session event correlation system 300 may optionally include a user interface 304, for example, including a display 306 and a keyboard 308. Memory 314 includes high-speed random access memory and may also include non-volatile memory, such as one or more magnetic disk storage devices (not shown). Memory 314 may also include mass storage that is remotely located from the central processing unit(s) 302. Memory 314 preferably stores:

- an operating system 316 that includes procedures for handling various basic system services and for performing hardware dependent tasks;
- a network communication module 318 that is used for connecting system 300 to various security devices or client computers (not shown) and possibly to other servers or computers via one or more communication networks (wired or wireless), such as the Internet, other wide area networks, local area networks, metropolitan area networks, and so on;
- a system initialization module 320 that initializes other modules and data structures stored in memory 314 required for the appropriate operation of system 300;
- an intra-session event correlation engine module 322 that groups various events into different network sessions based on their session qualifiers;
- a plurality of tables for storing different NAT definitions and network sessions as well as their corresponding events; and
- an event log for storing network events processed by system 300.

The plurality of tables includes:
- a NAT definition table 340 for storing information about NAT devices and their associated NAT rules;
- a completed session table (CST) 342 for storing events associated with a session whose end-to-end session qualifiers are completely determined from its source to its destination;
- a pending session table (PST) 344 for storing events associated with a session whose end-to-end session qualifiers are not completely determined, and the session, insofar as known to the system 300, either (A) does not pass through any device performing dynamic NAT, or (B) passes through a NAT device whose NAT definition is ambiguous; and
- a dynamic NAT session table (DNST) 346 also for storing events associated with a session whose end-to-end session qualifiers are not completely determined, where the events do not qualify for storage in the PST; events stored in the DNST are associated with a session that passes through at least one NAT device whose NAT rule is an unambiguous dynamic NAT rule with respect to the session.

In one embodiment, CST 342 is implemented as a Hash map with a session qualifier as the Hash key, with all events belonging to the same session having the same Hash value. Any session in CST can be efficiently looked up by hashing one of its session qualifiers. Note that because of NAT, multiple session qualifiers can map to the same network session.

Similarly, PST 344 can also be implemented as a Hash map with a session qualifier as the Hash key, with events belonging to the same session having the same Hash value. Additionally, an expiry timer is associated with an event when it is stored in PST. Such timer is used for promoting the event from PST to CST.

DNST 346 can also be implemented as a Hash map. However, the Hash key in the case of DNST is not a single session qualifier, but essentially a group of session qualifiers that can be generated by a NAT device and correspond to the same network session. Such a group of session qualifiers are defined as a session specification. Similar to PST, each event in DNST also has an associated expiry timer for event promotion from DNST to CST. Besides expiry timers, events in DNST can also be correlated with other events and then promoted to CST by a NAT message. A NAT message is a special network event sent by a NAT device and it contains information about a specific address translation promoted by the device for an IP packet.

Intra-session event correlation engine module 322 includes executable procedures, sub-modules, and other data structures supporting the intra-session event correlation process. In the same embodiment, the correlation engine module includes:

an event-to-session mapping module 324 that tries to associate an incoming event with an existing network session or generate a new network session for such incoming event in memory 314;

a PST session promoting module 326 that, upon the expiry of a timer associated with one event in PST, selects all the events belonging to the same session in PST and promotes them to CST; and a DNST session promoting module 328 that, upon the expiry of a timer associated with one event in DNST selects all the events belonging to a same session in both PST and DNST and then promotes them to CST.

Events move between CST, PST, and DNST as they progress through the various stages of session correlation. When an event first arrives, it will be first compared against any existing sessions in CST or PST. If no match is found, a NAT lookup is performed to determine NAT transformations that may apply to the event. In addition, a determination is made whether any of these NAT transformations is an ambiguous dynamic NAT. If so, the event is placed in the PST. Otherwise it is placed in the DNST. In other words, only the events from sessions using unambiguous dynamic NAT are placed in the DNST.

The NAT lookup step also returns a set of session qualifiers that are placed in the tables to match against subsequent events from the same session. NAT messages explicitly describing NAT transformations for certain network events are handled in a similar way and they can connect disparate events waiting in PST and DNST. Upon a timer expiry, events either move from PST to CST or move from DNST to CST by picking up additional events belonging to the same session from PST according to some additional heuristics. In other words, the main purpose of PST and DNST is to serve as a staging area for additional session formation.

Once a set of events reaches CST, a new network session entry is generated correspondingly in CST. For this new network session, its end-to-end and intermediate session qualifiers have been completely determined. Other events stay in PST or DNST only for a short period of time before being promoted to CST since NAT messages associated with those events, if they ever arrive at system 300, will arrive before the first packet of a network session that triggers those NAT messages reaches its destination.

FIG. 4A-4D provide more details of the embodiment. At step 401 in FIG. 4A, a newly generated network event EVT arrives at system 300 after being parsed by an event parser (not shown). Event EVT is characterized by a session qualifier. At step 403, event EVT's session qualifier is used to match any existing network session in CST. If there is a match, event EVT will be added to the matched network session in CST at step 405 and the correlation process stops at step 407, waiting for next incoming network event to arrive.

If there is no match at step 403, the correlation process moves to step 409 where event EVT's session qualifier is used to match any existing network session in PST. If there is a match between event EVT and a network session in PST, event EVT will be assigned an expiry timer and then added to the matched network session in PST at step 411. The correlation process stops at step 413 and event EVT waits to be promoted to CST by its expiry timer.

If there is no match at step 409, the correlation process moves to step 415 which, using the session qualifier of event EVT as input, does the following NAT lookup:

The correlation process determines whether event EVT can be associated with any NAT device deployed on the network, and if so, it traverses the network from such device towards the source and destination of the message which caused the event EVT to be generated.

In response to the network traversal for event EVT, the correlation process generates an ordered list of session qualifiers (the session qualifier list) and an ordered list of session specs (the session spec list). Session qualifier lists and session spec lists are described in more detail below with reference to FIG. 5. A session spec contains a set of session qualifiers. Each session qualifier from the session qualifier list is contained in one session spec from the session spec list.

Any network event is only generated by one security device in response to one network session. If only two NAT devices are identified during the NAT lookup for event EVT at step 415, one NAT device during traversal towards the event's source and one NAT device during traversal towards the event's destination, the event's origin can be uniquely located on the network. In this case, there is no ambiguity with regard to the determination of event EVT's origin on the network at step 417, and therefore event EVT will be stored in the DNST, as described below with reference to FIG. 4B.

However, if there are at least two NAT devices identified in a single traversal either towards event EVT's source or its destination, i.e., there is any ambiguity with regard to the determination of event EVT's origin, event EVT is not stored in DNST. Instead, event EVT is stored in PST. Before creating a new entry in PST for storing event EVT at step 421, the correlation process first determines whether any session qualifier in the session qualifier list generated by the NAT lookup at step 415 matches any existing session in PST at step 423. This step is essentially the same as step 409. Events belonging to the same session are coalesced in PST at step 425. Finally, the correlation process stops at step 413, waiting for next event's arrival.

Figure 4A:
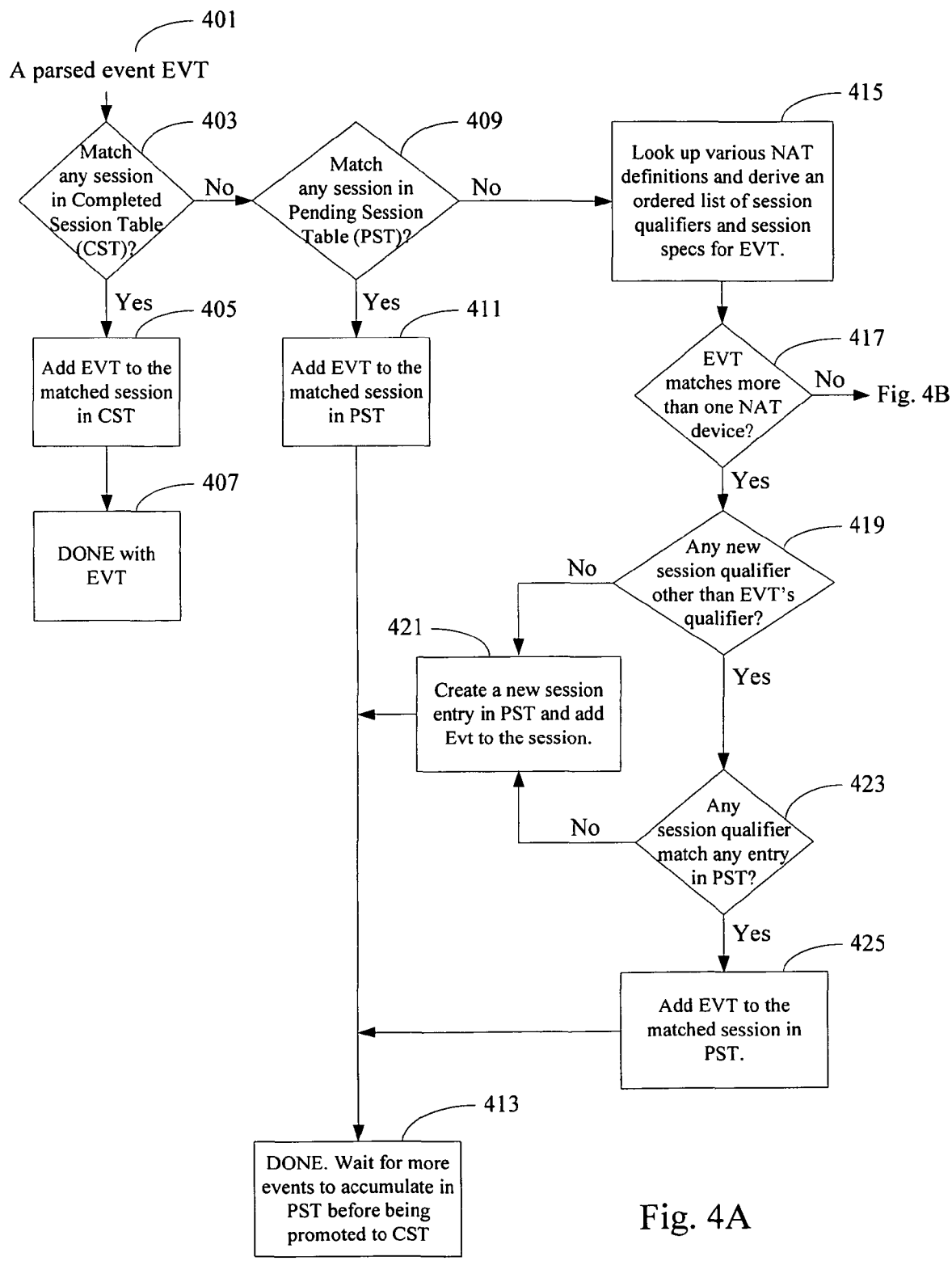
FIG. 4A-4B is a flowchart illustrating the major steps of an embodiment.
Figure 4B:
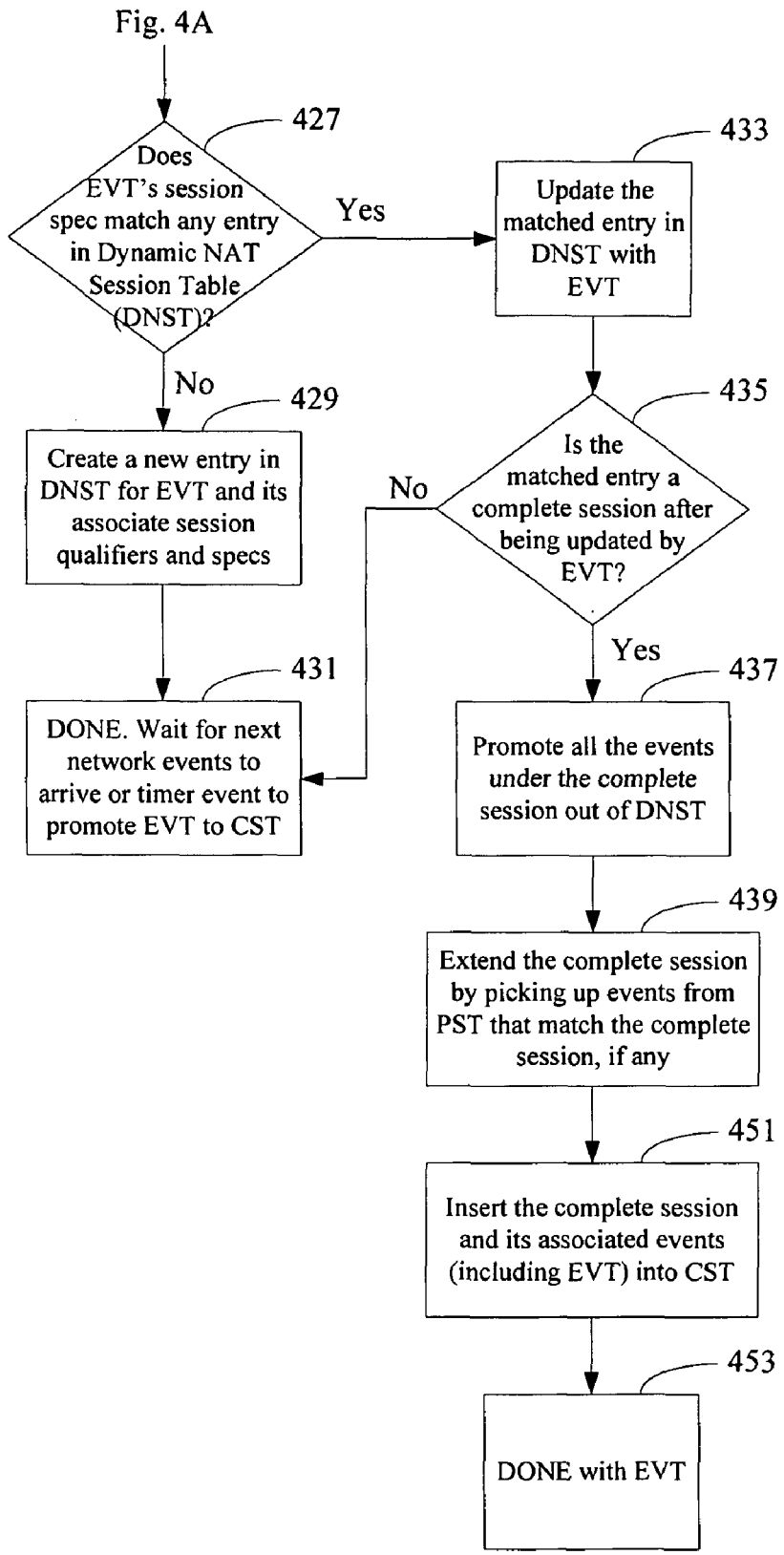

Following step 417, FIG. 4B illustrates the correlation process in the case that there is no ambiguity with regard to the determination of event EVT's origin on the network.

At step 427, a session spec in the session spec list generated at step 415 is first compared against any existing session spec in DNST. If no match is found, the correlation process creates a new entry in DNST for the session spec list at step 429. This new entry comprises event EVT and EVT's session spec list and session qualifier list. Event EVT is also assigned an expiry timer when it is attached to the new entry in DNST. The process stops at step 431 waiting for next incoming network events or timer expiry to promote event EVT from DNST to CST.

However, if there is an entry in DNST that matches the session spec list of event EVT (step 427-Yes), indicating that DNST stores at least another network event from the same network session as event EVT, the correlation process updates the matching entry by attaching event EVT to a corresponding session qualifier belonging to the matching entry in DNST at step 433.

After attaching event EVT to an existing entry in DNST, the correlation process determines whether the corresponding network session is complete. As a heuristic rule, a network session is complete if there is only one session qualifier per session spec in the session spec list. At step 435, the network session that event EVT is affiliated with is determined to be complete if there is a set of session qualifiers, one for each spec in the same session spec list. Otherwise, the session is not complete.

If the session that event EVT is affiliated with is complete, all the corresponding events are coalesced into a single session at step 437. At step 439, the correlation process collects other events, if any, previously stored in PST that belong to the same session, and extends the coverage of the network session. Finally, all the events relating to the same complete session are promoted to CST at step 451 and the correlation process stops at step 453. However, if no complete session is found at step 435, the correlation process stops at step 431, waiting for next incoming network events.

FIGS. 4A and 4B cover the network event correlation process when an event first arrives at an intra-session event correlation system 300. The event either resides in CST, indicating that this event is affiliated with an existing completed session, or resides in PST or DNST, waiting for more incoming events to establish a completed network session. If those events do not materialize, expiry timers associated with events in PST or DNST periodically issue timer events that trigger a session cleanup process in PST or DNST.

Figure 4C:
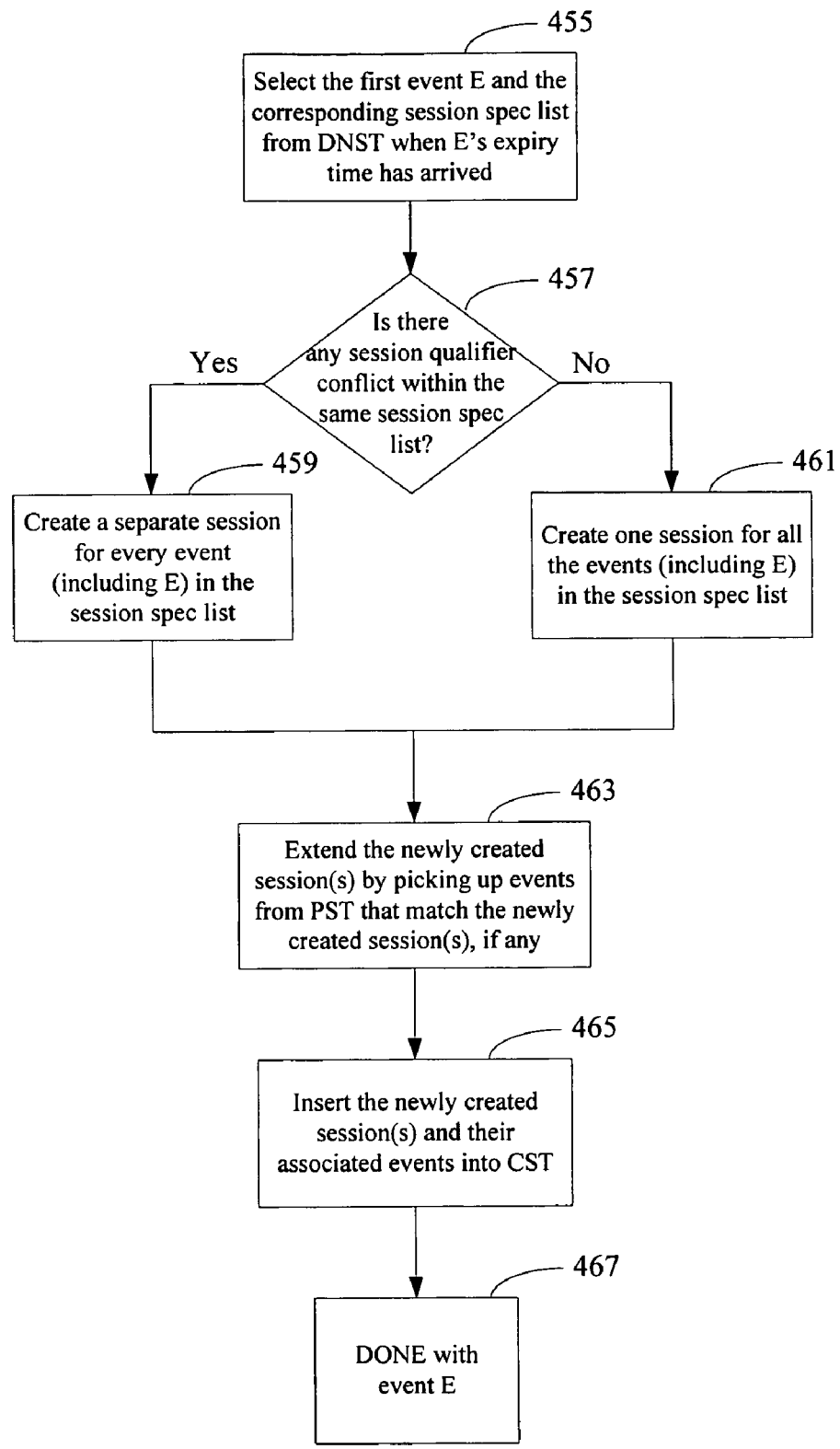
FIG. 4C is a flowchart illustrating an event correlation and promotion process using an expiry timer.

FIG. 4C provides more details of this cleanup process in DNST. As discussed before, when an event is first assigned to an entry in DNST, an expiry timer is associated with the event. Therefore, in addition to grouping events into different network sessions, the correlation process also maintains a separate queue of expiry timers associated with different events in DNST.

At step 455, when an event E's expiry time arrives, the correlation process first identifies the corresponding list of session specs that event E belongs to in DNST. At step 457, the identified list is further examined to detect any session qualifier conflict within the list. A session qualifier conflict in a session spec list means that there is more than one session qualifier under the same session spec in the spec list. In other words, there is more than one network session in the same session spec list, and therefore events in the same session spec list belong to two or more different sessions. Therefore, in order to avoid grouping events belonging to different sessions into the same session, whenever there is an conflict within the session spec list identified at step 457, all the events in the spec list are assigned to different sessions at step 459. However, if there is only one session qualifier per session spec, the session spec list contains at most one unique network session. Therefore, all the events associated with the session spec list can be coalesced into a single session at step 461.

After creating one or more new network sessions at step 459 or 461 and before promoting these sessions to CST, the correlation process needs to check if there are additional events in PST belonging to these newly created sessions at step 463. As discussed before, a network event could be temporarily stored in PST if there was any ambiguity in determining the event's origin when the event first arrived. Such ambiguity may be resolved later when more events relating to the same session arrive. Step 463 provides such an opportunity for the system 300 to extend the newly created session by picking up events from PST that match the newly created session.

At step 465, the newly created sessions and their associated events are inserted into CST and the correlation process stops at step 467 until it is invoked again by another event's expiry timer stored in the queue.

Figure 4D:
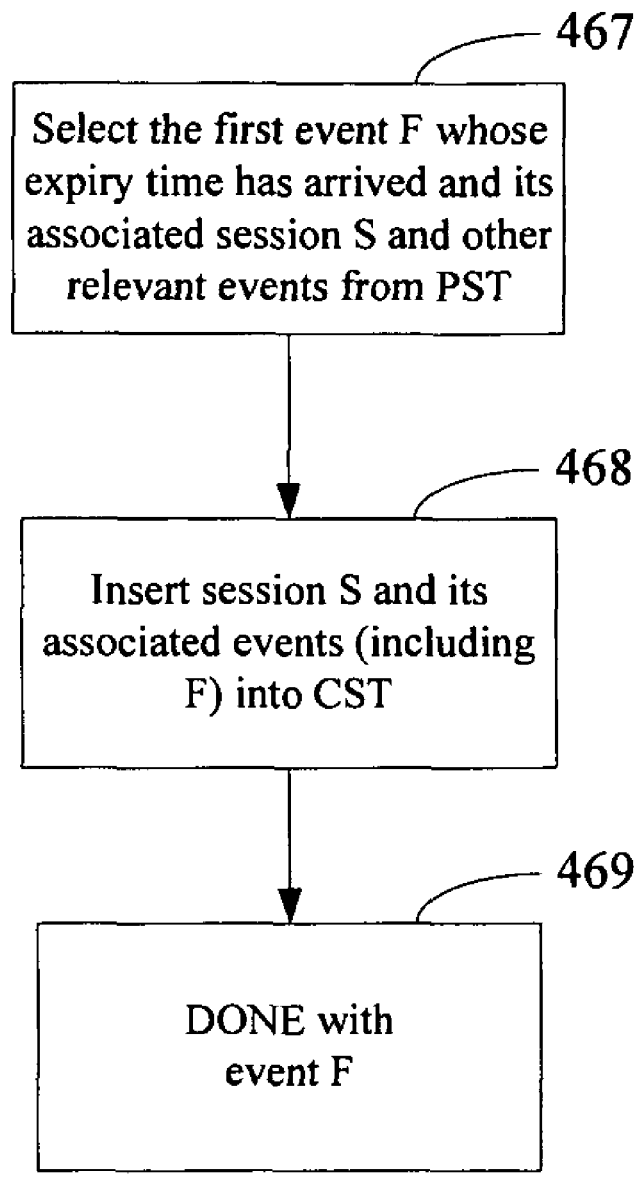
FIG. 4D is a flowchart illustrating another event correlation and promotion process using an expiry timer.

FIG. 4D illustrates a similar process that happens in PST. As discussed before, each network event stored in PST is also associated with an expiry timer and the correlation process maintains another queue of expiry timers associated with different events in PST. At step 467, when an event F's expiry time arrives, the correlation process first identifies a network session that event F is associated with in PST. Then the correlation process inserts the identified session and its associated events (including F) into CST as a new entry at step 468. Finally, the correlation process stops at step 469, waiting for next invocation stored in the queue.

The purpose of NAT lookup discussed at step 415 of FIG. 4A is to first locate the origin of event EVT by identifying a NAT device on the network according to EVT's session qualifier, and to then construct an ordered list of session qualifiers and an ordered list of session specs based on EVT's session qualifier and the device's NAT rule. Event EVT's session spec list and session qualifier list significantly expand the correlation coverage of event EVT. Therefore, if there is another network event whose session spec list correlates with event EVT's session spec list as defined by steps 427 and 433 of FIG. 4B, these two events may belong to the same network session, even though the session qualifiers of these two events can not correlate with each other directly.

Figure 5:
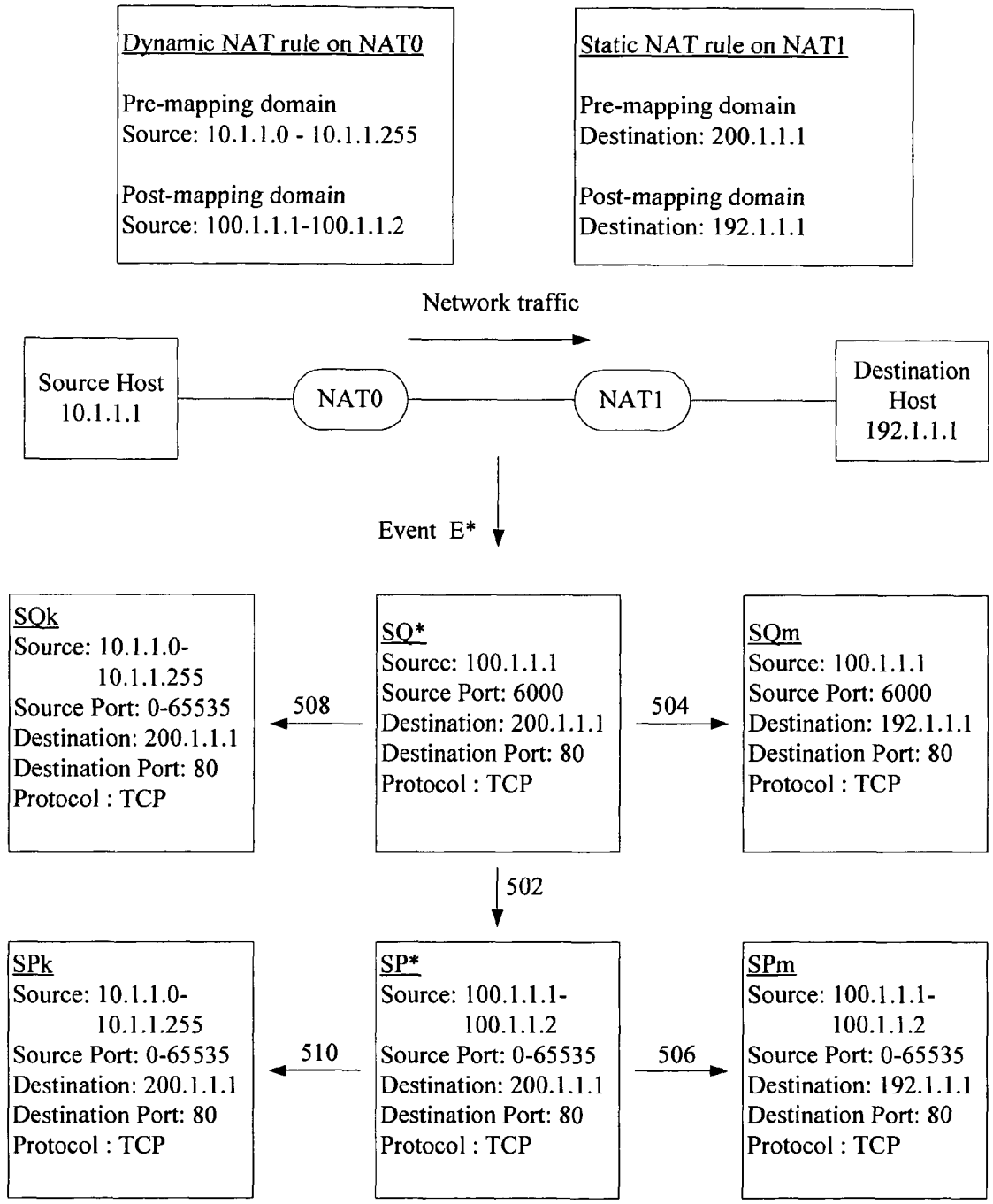
FIG. 5 illustrates a NAT lookup process of the present invention.

FIG. 5 provides an example to illustrate the NAT lookup process for constructing an ordered list of session qualifiers and an ordered list of session specs. NAT devices NAT0 and NAT1 establish a network session between source host 10.1.1.1 and destination host 192.1.1.1. NAT0 has a dynamic NAT rule that maps source addresses from a pre-mapping domain 10.1.1.0-10.1.1.255 to a post-mapping domain 100.1.1.1-100.1.1.2. NAT1 has a static NAT rule that maps destination address from 200.1.1.1 to 192.1.1.1. As shown in FIG. 5, event E* is generated by a security device (not shown) that has a session qualifier SQ* comprising the following parameters: (source SA*, source port SP*, protocol P*, destination DA* and destination port DP*).

The first step of NAT lookup is to determine the origin of event E* on the network. Event E*'s session qualifier SQ* is covered by NAT0's post mapping domain, and by NAT1's pre-mapping domain. Therefore, event E* should originate from a security device located between NAT0 and NAT1.

The second step is to generate a session spec out of session qualifier SQ* using NAT0 and NAT1's NAT rules. Following arrow 502, a session spec SP* is generated based on session qualifier SQ* and the two NAT rules by replacing the source and destination addresses of SQ* with NAT0's post-mapping domain and NAT1's pre-mapping domain. Obviously, session qualifier SQ* is contained by session spec SP*.

The third step is to traverse session qualifier SQ* towards destination host 192.1.1.1. Following arrow 504 and applying the static NAT rule of NAT1 to SQ*, a session qualifier SQm is generated after replacing destination address 200.1.1.1 with 192.1.1.1. Similarly, a session spec SPm is generated by following arrow 506, where session qualifier SQm is covered by session spec SPm.

The fourth step is to traverse session qualifier SQ* towards source host 10.1.1.1. Following arrows 508 and 510 and applying the dynamic NAT rule to SQ* and SP*, a new session qualifier SQk and a new session spec SPk are generated respectively. Because the NAT rule associated with NAT0 is dynamic, SQk's source address is not a single address, but a range. A session qualifier, e.g., SQm, is completely determined if its parameters are all single "numbers" (i.e., parameter value); otherwise, a session qualifier, e.g., SQk, is incompletely determined if any of its parameters is a range, not a single address or parameter value.

As a general rule, the session qualifier list generated by NAT lookup should only include completely determined session qualifiers, not any incompletely determined session qualifiers. Therefore, the session qualifier list of event E* comprises two session qualifiers (SQ*, SQm). However, any parameter of a session spec can be a range or a single number. Therefore, the session spec list of event E* comprises three members (SPk, SP*, SPm).

A generalization of the traversal process discussed above returns the following results:
  an ordered list of session qualifiers ( . . . , SQk, SQ*, SQm, . . . ) where SQm is a session qualifier towards the destination of the session and SQk is a session qualifier towards the source of the session; and
  an ordered list of session specs ( . . . , SPk, SP*, SPm, . . . ) where SPm is a session spec towards the destination of the session, and SPk is a session spec towards the source of the session.

Figure 6A:
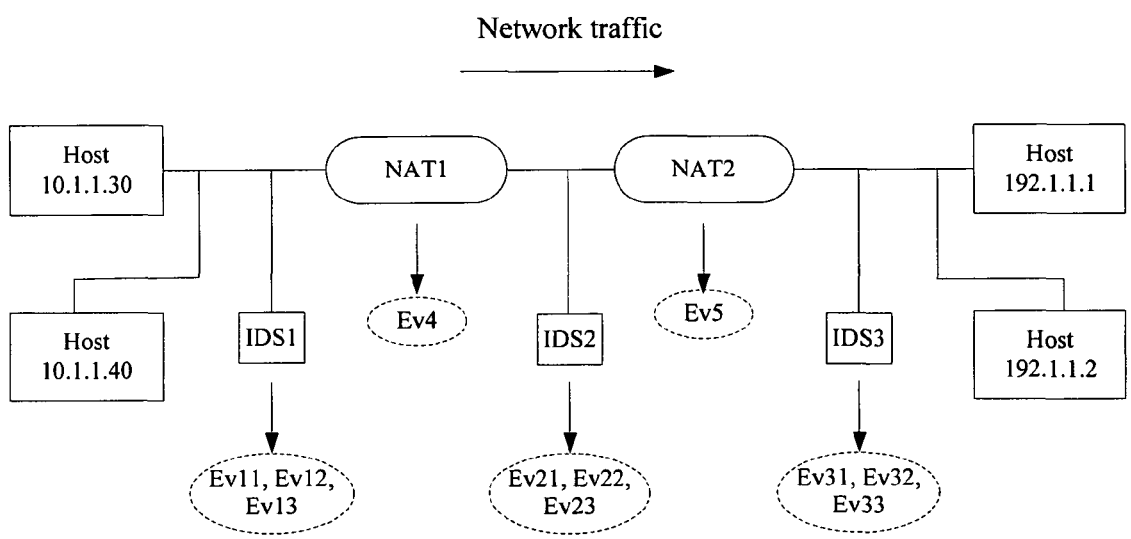
FIG. 6A shows a network topology.

FIG. 6A-6F provide an example including three scenarios to illustrate the key features of the embodiment. FIG. 6A depicts a portion of a network having four hosts 10.1.1.30, 10.1.1.40, 192.1.1.1, and 192.1.1.2, two NAT devices NAT1 and NAT2, and three security devices IDS1, IDS2 and IDS3. NAT1 is associated with a dynamic NAT rule mapping source address from pre-mapping domain 10.1.1.0-10.1.1.255 to post-mapping domain 20.1.1.1. NAT2 is associated with a static NAT rule mapping destination addresses from 100.1.1.1-100.1.1.10 to 192.1.1.1-192.1.1.10 and destination port from 80 to 8080. Events Ev11, Ev12, and Ev13 are three network events generated by IDS1, each corresponding to a different network session. Similarly, IDS2 is responsible for the generation of Ev21, Ev22, and Ev23 and IDS3 is responsible for the generation of Ev31, Ev32, and Ev33. Initially, the three tables CST, PST and DNST of system 300 are all empty.

Figure 6B:
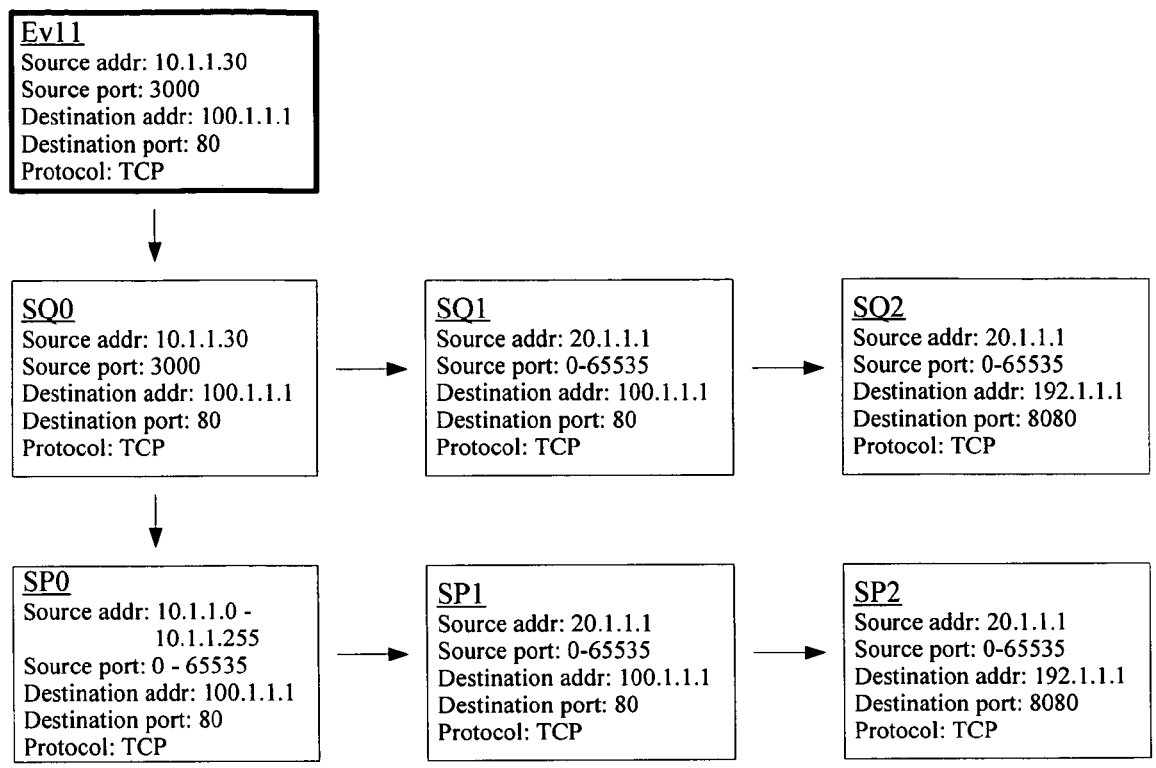
FIG. 6B-6D demonstrate a first scenario in which there is only network session.
Figure 6B:
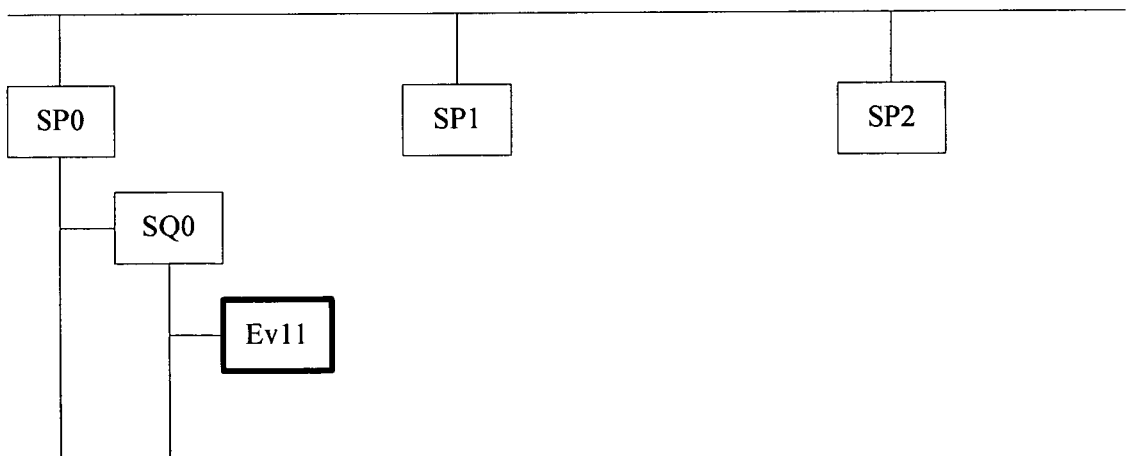
Figure 6C:
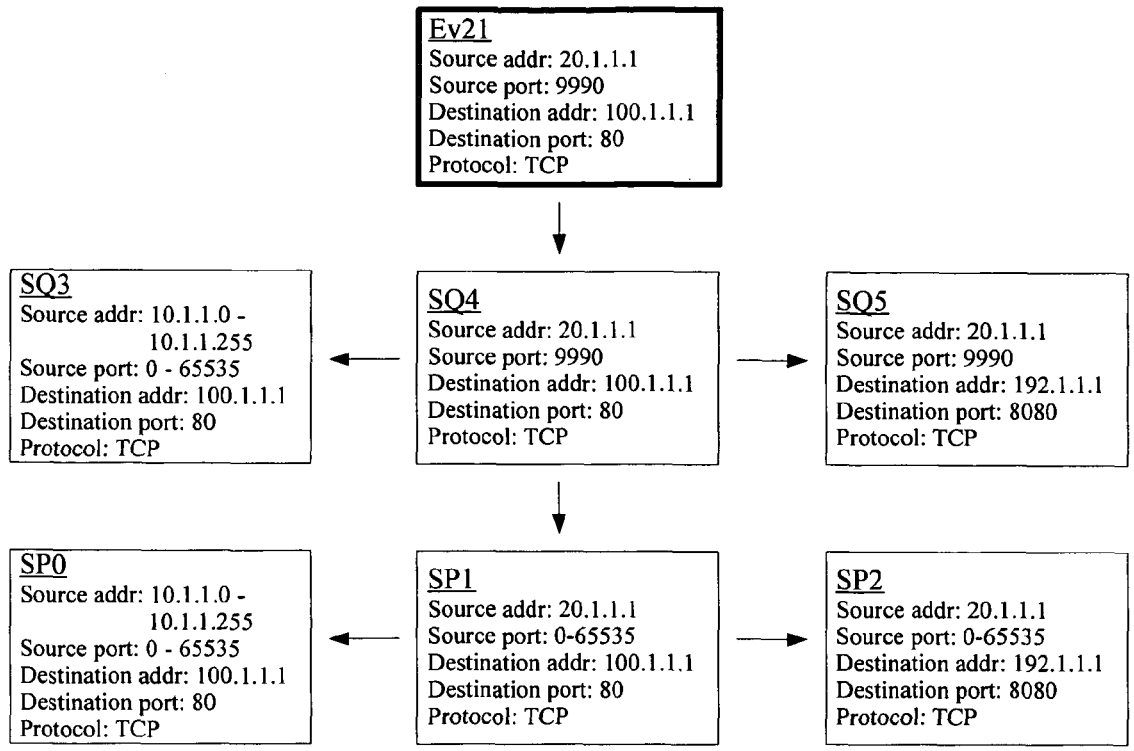
Figure 6C:
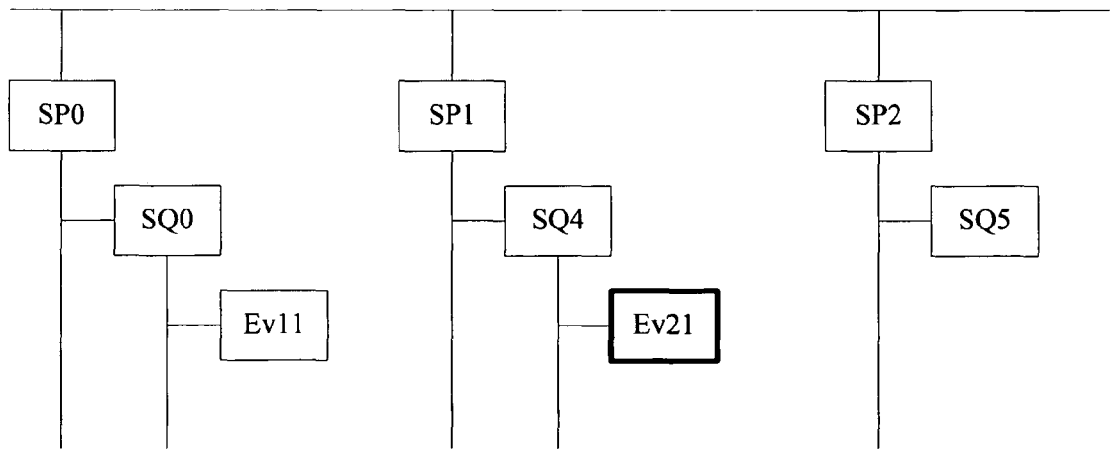
Figure 6D:
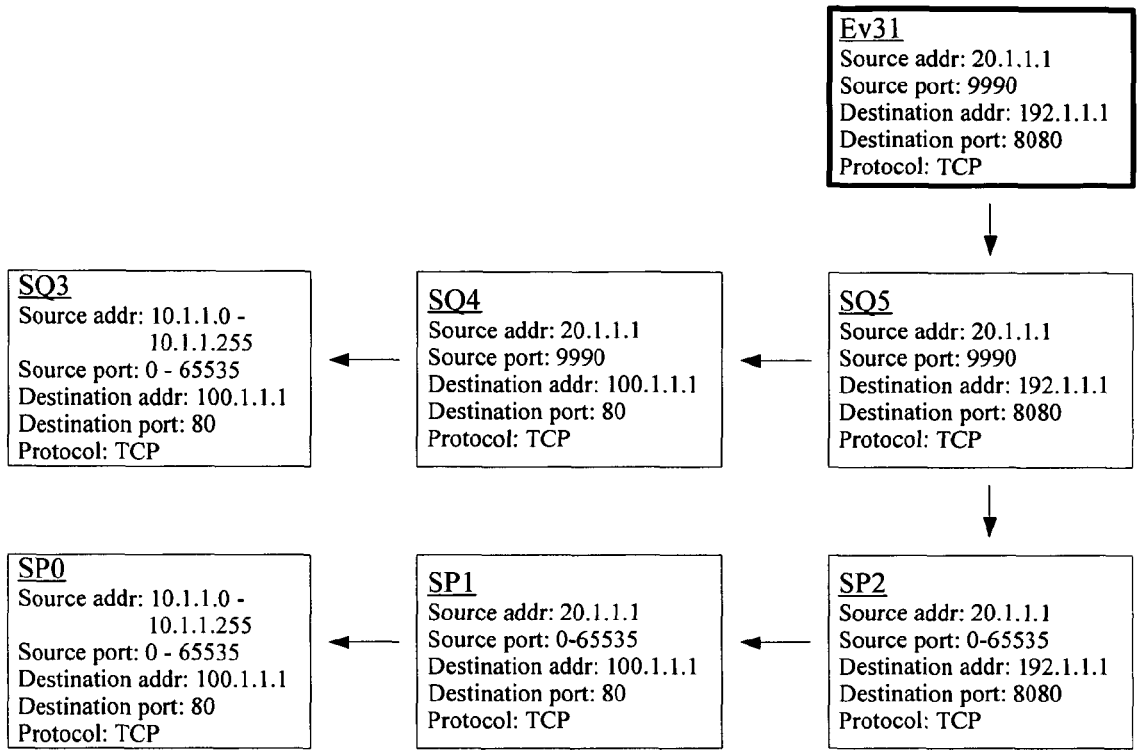
Figure 6D:
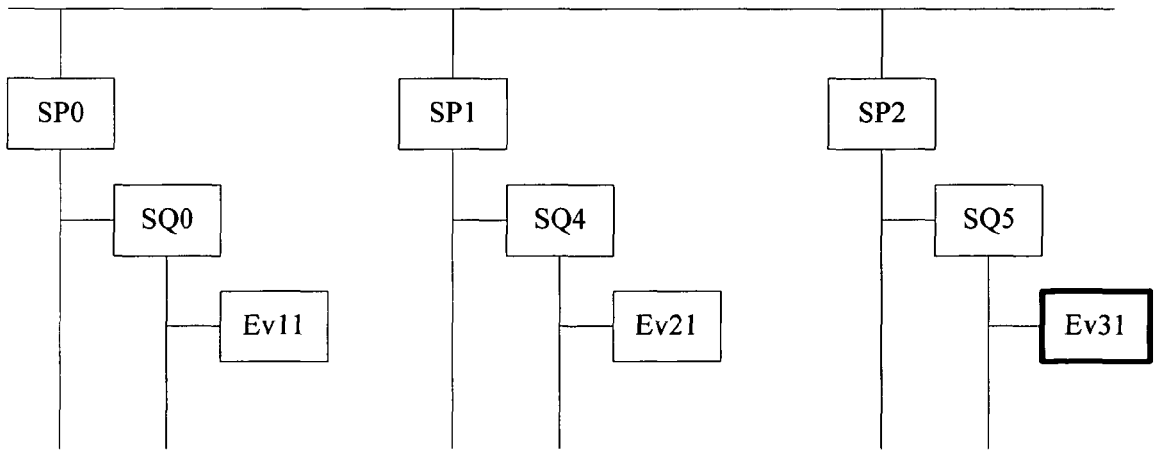

In the first scenario, shown in FIG. 6B-6D, three events Ev11, Ev21, and Ev31 arrive sequentially at system 300. When Ev11 first arrives, it cannot match any entry in CST or PST since both of them are empty. A NAT lookup generates an ordered list of session qualifiers (SQ0, SQ1, SQ2) and an ordered list of session specs (SP0, SP1, SP2). Since the only NAT device matching Ev11 is NAT1, there is no ambiguity in NAT transformation for Ev11. Therefore, a new entry is created in DNST containing Ev11 and its associated session spec list and session qualifier list. Since SQ1 and SQ2 are not completely determined (source port is a range, not a single value), only SP0 contains a session qualifier SQ0 and event Ev11, and SP1 and SP2 do not have any session qualifier or network event information.

FIG. 6C shows the correlation result after the arrival of Ev21. Similarly, there is no match in CST and PST and NAT lookup for Ev21 generates a new ordered list of session qualifiers (SQ3, SQ4, SQ5) and the same ordered list of session specs (SP0, SP1, SP2). Among the new session qualifiers in the list, both SQ4 and SQ5 are completely determined. However, since the session spec list remains the same, there is no new entry generated in DNST. Instead, SQ4 and Ev21 are attached to SP1, and SQ5 are attached to SP2.

FIG. 6D illustrates the correlation result after the arrival of Ev31. Similarly, there is no match in CST and PST and NAT lookup for Ev31 generates the same ordered list of session qualifiers (SQ3, SQ4, SQ5) and the same ordered list of session specs (SP0, SP1, SP2) as Ev21. Therefore, no new entry is created in DNST and the only difference in DNST before and after the arrival of Ev31 is that SQ5 has a network event Ev31 associated with it.

As discussed before, when an event is inserted into DNST, the correlation process also assigns an expiry timer to the event and maintains a separate queue of expiry timers. Accordingly in the first scenario here, there is a queue of three expiry timers in DNST, each timer corresponding to one of the three events Ev11, Ev21, or Ev31. When one of the three timers expires, it issues a timer expire event to invoke the correlation process. In response, the correlation process checks if there is any conflict within the session spec list containing Ev11, Ev21, and Ev31. As shown in FIG. 6D, since there is only one session qualifier per spec, i.e., SQ0 for SP0, SQ4 for SP1, and SQ5 for SP2, all the three events Ev11, Ev21, and Ev31 are correlated into a single session and then promoted to CST. Since PST is empty here, the correlation process does not pick up any event from PST when promoting the three events to CST.

Figure 6E:
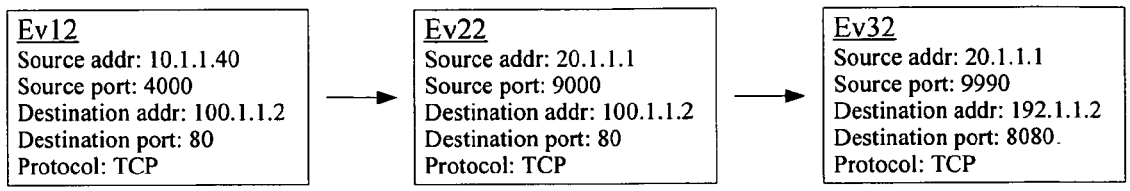
FIG. 6E demonstrates a second scenario in which there are two non-overlapping sessions.
Figure 6E:
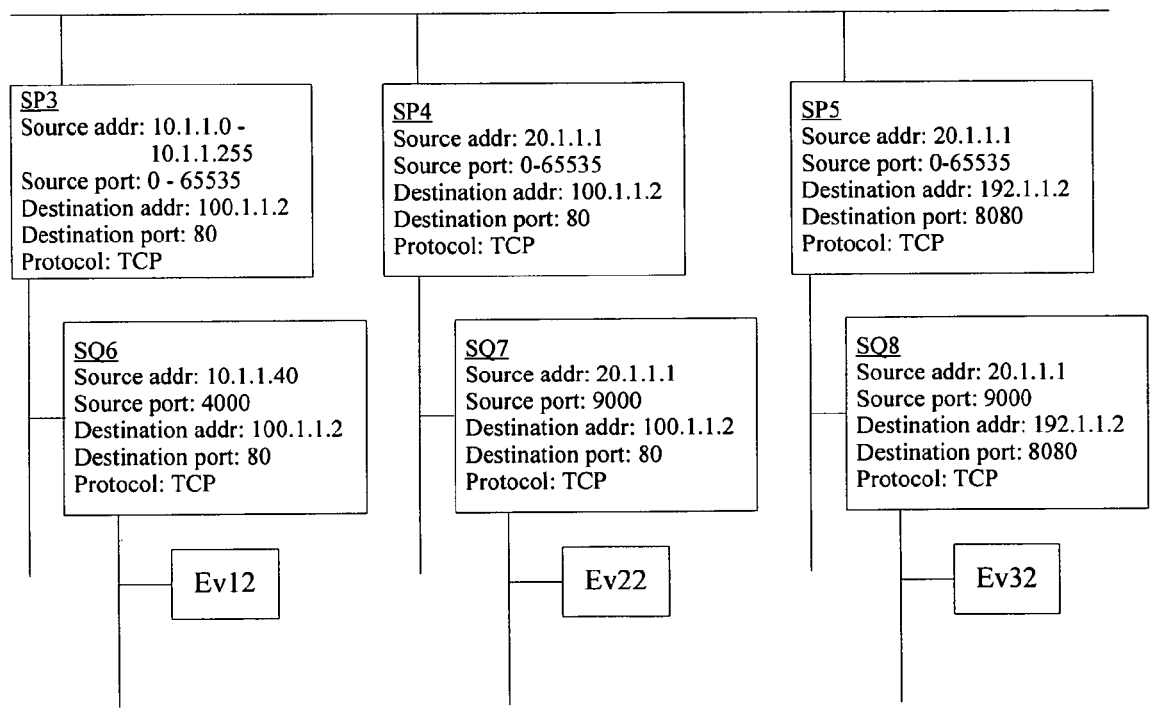

In the second scenario, three more events Ev12, Ev22, and Ev32 arrive at the correlation system before any expiry timer associated with the first three events expires. Repeating the same NAT lookup algorithm that was applied in the first scenario, the correlation process generates a new ordered list of session qualifiers (SQ6, SQ7, SQ8) and a new ordered list of session specs (SP3, SP4, SP5) as shown in FIG. 6E. Since there is no overlap between the session spec list of Ev11, Ev21, and Ev31 and the session spec list of Ev12, Ev22, and Ev32, whenever a timer associated with one of the six events expires, one set of three events corresponding to the same session are correlated and promoted to CST. The three remaining events wait until another timer associated with one of the three events expires.

Figure 6F:
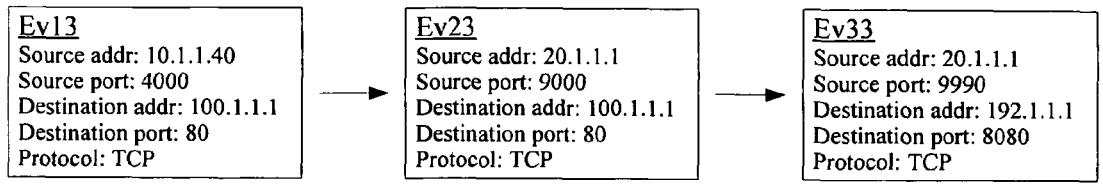
FIG. 6F demonstrates a third scenario in which there are two overlapping sessions.
Figure 6F:
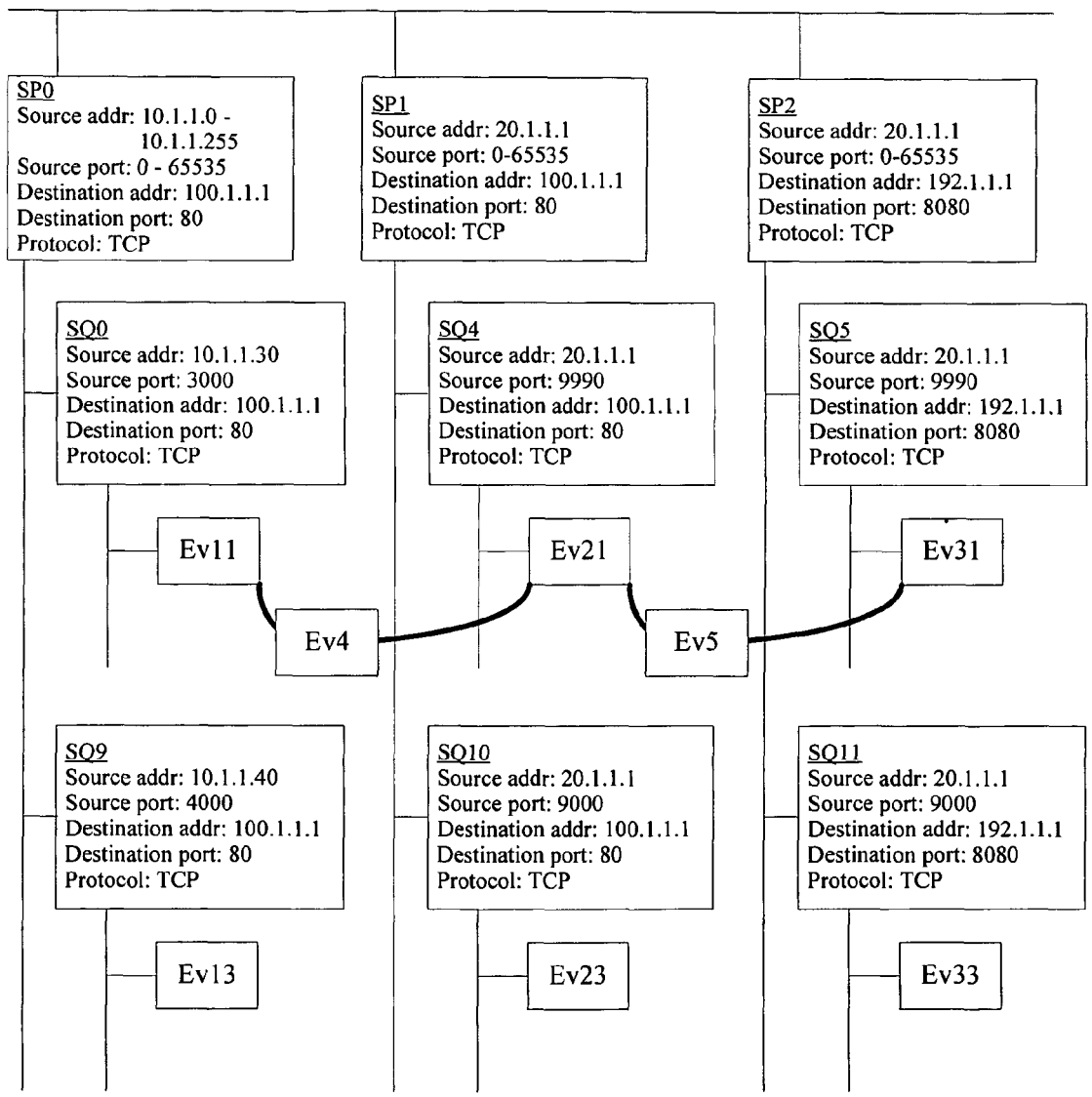

In the third scenario, three more events Ev13, Ev23, and Ev33 arrive following on the heels of events Ev11, Ev21, and Ev31. Applying the same NAT lookup methodology to events Ev13, Ev23, and Ev33, the correlation process generates a new ordered list of session qualifiers (SQ9, SQ10, and SQ11) and the same ordered list of session specs (SP0, SP1, SP2). As shown in FIG. 6F, since there are two session qualifiers within the same session spec:
  {SQ0, SQ9}∈SP0,
  {SQ4, SQ10}∈SP1, and
  {SQ5, SQ11}∈SP2, there is a session qualifier conflict within each session spec. This conflict can not be resolved by the expiry timers associated with the corresponding network events. Instead, NAT messages are necessary here in order to resolve the conflicts. In this example, it is assumed that two NAT messages, Ev4 from NAT1 and Ev5 from NAT2, arrive at the correlation system later:
  Ev4 defining the NAT translation done by NAT1 from source address 10.1.1.30, source port 3000 to source address 20.1.1.1, source port 9990; and
  Ev5 defining the NAT translation done by NAT2 from source address 100.1.1.1, source port 80 to source address 192.1.1.1, source port 8080.

After the correlation process inserts Ev4 and Ev5 into DNST, Ev11, Ev4, Ev21, Ev5, and Ev31 clearly belong to a single network session. Without waiting further for any expiry timer invocation, this set of events is removed from DNST and promoted to CST. After that, there is only one session qualifier per session spec, SQ9 for SP0, SQ10 for SP1, and SQ11 for SP2. Since the conflicts have been resolved, these three events will be correlated into the same session and promoted to CST whenever there is an expiry timer invocation.

On the other hand, according to the cleanup process illustrated in FIG. 4C, if there is no NAT message like Ev4 and Ev5 in DNST, six new sessions are created in CST in response to the six events Ev11, Ev21, Ev31, Ev13, Ev23, and Ev33 respectively and then inserted into CST.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of grouping network events, the method comprising the computer-implemented steps of:
   receiving a stream of network events, each network event including a set of event parameters in association with a network session that corresponds to a message being transmitted through a network, wherein the set of event parameters includes two or more of: a source address, a source port, a destination address, a destination port, and a network protocol, wherein a plurality of network events are associated with a security attack being detected;
   for a particular network event in the plurality of network events:
   making an initial session determination by determining whether a particular network event belongs to a same network session as any previously received network event; wherein said network session is a communication channel established between a source host and a destination host over the network, wherein the initial session determination includes comparing one or more of the set of event parameters of the particular network event with one or more of the set of event parameters of one or more previously received network events, and if there is a match, determining that the particular network event belongs to a same network session as those matching one or more previously received network events;
   identifying information of network address translations performed by one or more of the devices that translate one or more of the set of event parameters for the particular network event to one or more other event parameters on the communication channel, wherein each of said one or more devices is associated with at least one network address translation rule, each network address translation rule comprising a pre-mapping parameter domain and a post-mapping parameter domain for one or more event parameters;
   categorizing the particular network event based at least in part on at least one of the session determination and the information of network address translations performed;
   identifying another categorized network event associated with the one or more other event parameters;
   grouping the categorized particular network event and the identified other categorized network event into a set of network events associated with the security attack;
   wherein the information of network address translations performed is received after the categorized network event;
   wherein the method is performed by one or more computing devices.

2. The method of claim 1, further comprising performing, at a predefined time,
   sending the grouped events to a network security monitoring device.

3. The method of claim 1, wherein said identifying includes:
   identifying a first network address translation rule associated with a first device on a network transmission path whose pre-mapping parameter domain contains one or more of the set of parameters of the particular network event;
   estimating a first set of event parameters contained in the post-mapping parameter domain of the first network address translation rule after applying the first network address translation rule to one or more of the set of parameters of the particular network event;
   identifying a second network address translation rule associated with a second device on a network transmission path whose post-mapping parameter domain contains one or more of the set of parameters of the particular network event; and
   estimating a second set of event parameters contained in the pre-mapping parameter domain of the second network address translation rule after applying the second network address translation rule to one or more of the set of parameters of the particular network event.

4. The method of claim 1, wherein the categorized particular network event and the identified other categorized network event belong to different categories during said categorizing.

5. The method of claim 1, wherein the pre-mapping parameter domain of one network address translation rule overlaps the post-mapping parameter domain of another network address translation rule.

6. A non-transitory computer readable storage medium storing one or more instructions, which, when executed by one or more processing units, cause the one or more processing units to perform:
   receiving a stream of network events, each network event including a set of event parameters in association with a network session that corresponds to a message being transmitted through a network, wherein the set of event parameters includes two or more of: a source address, a source port, a destination address, a destination port, and a network protocol, wherein a plurality of network events are associated with a security attack being detected;
   for a particular network event in the plurality of network events:
   making an initial session determination by determining whether a particular network event belongs to a same network session as any previously received network event; wherein said network session is a communication channel established between a source host and a destination host over the network, wherein the initial session determination includes comparing one or more of the set of event parameters of the particular network event with one or more of the set of event parameters of one or more previously received network events, and if there is a match, determining that the particular network event belongs to a same network session as those matching one or more previously received network events;

identifying information of network address translations performed by one or more of the devices that translate one or more of the set of event parameters for the particular network event to one or more other event parameters on the communication channel, wherein each of said one or more devices is associated with at least one network address translation rule, each network address translation rule comprising a pre-mapping parameter domain and a post-mapping parameter domain for one or more event parameters;

categorizing the particular network event based at least in part on at least one of the session determination and the information of network address translations performed;

identifying another categorized network event associated with the one or more other event parameters;

grouping the categorized particular network event and the identified other categorized network event into a set of network events associated with the security attack;

wherein the information of network address translations performed is received after the categorized network event.

7. The non-transitory computer-readable storage medium of claim 6, wherein the instructions, when executed by the one or more processing units, cause the one or more processing units to perform, at a predefined time, sending the grouped events to a network security monitoring device.

8. The non-transitory computer-readable storage medium of claim 6, wherein the instructions, when executed by the one or more processing units, cause said identifying by:

identifying a first network address translation rule associated with a first device on a network transmission path whose pre-mapping parameter domain contains one or more of the set of parameters of the particular network event;

estimating a first set of event parameters contained in the post-mapping parameter domain of the first network address translation rule after applying the first network address translation rule to one or more of the set of parameters of the particular network event;

identifying a second network address translation rule associated with a second device on a network transmission path whose post-mapping parameter domain contains one or more of the set of parameters of the particular network event; and estimating a second set of event parameters contained in the pre-mapping parameter domain of the second network address translation rule after applying the second network address translation rule to one or more of the set of parameters of the particular network event.

9. The non-transitory computer-readable storage medium of claim 6, wherein the instructions, when executed by the one or more processing units, cause the categorized particular network event and the identified other categorized network event to belong to different categories during said categorizing.

10. The non-transitory computer-readable storage medium of claim 6, wherein the pre-mapping parameter domain of one network address translation rule overlaps the post-mapping parameter domain of another network address translation rule.

11. An apparatus comprising:

one or more processing units on one or more devices;

one or more communication interfaces for receiving a stream of network events, each network event including a set of event parameters in association with a network session that corresponds to a message being transmitted through a network, wherein the set of event parameters includes two or more of: a source address, a source port, a destination address, a destination port, and a network protocol, wherein a plurality of network events are associated with a security attack being detected;

an event correlation engine for performing, for a particular network event in the plurality of network events:

making an initial session determination by determining whether a particular network event belongs to a same network session as any previously received network event; wherein said network session is a communication channel established between a source host and a destination host over the network, wherein the initial session determination includes comparing one or more of the set of event parameters of the particular network event with one or more of the set of event parameters of one or more previously received network events, and if there is a match, determining that the particular network event belongs to a same network session as those matching one or more previously received network events;

identifying information of network address translations performed by one or more of the devices that translate one or more of the set of event parameters for the particular network event to one or more other event parameters on the communication channel, wherein each of said one or more devices is associated with at least one network address translation rule, each network address translation rule comprising a pre-mapping parameter domain and a post-mapping parameter domain for one or more event parameters;

categorizing the particular network event based at least in part on at least one of the session determination and the information of network address translations performed;

identifying another categorized network event associated with the one or more other event parameters;

grouping the categorized particular network event and the identified other categorized network event into a set of network events associated with the security attack;

wherein the information of network address translations performed is received after the categorized network event.

12. The apparatus of claim 11, wherein the one or more communication interfaces are further configured for sending, at a predefined time, the grouped events to a network security monitoring device.

13. The apparatus of claim 11, wherein the event correlation engine is configured to perform said identifying by performing:

identifying a first network address translation rule associated with a first device on a network transmission path whose pre-mapping parameter domain contains one or more of the set of parameters of the particular network event;

estimating a first set of event parameters contained in the post-mapping parameter domain of the first network address translation rule after applying the first network address translation rule to one or more of the set of parameters of the particular network event;

identifying a second network address translation rule associated with a second device on a network transmission path whose post-mapping parameter domain contains one or more of the set of parameters of the particular network event; and estimating a second set of event parameters contained in the pre-mapping parameter domain of the second network address translation rule after applying the second network address translation rule to one or more of the set of parameters of the particular network event.

14. The apparatus of claim 11, wherein the event correlation engine is configured to cause the categorized particular network event and the identified other categorized network event to belong to different categories during said categorizing.

15. The apparatus of claim 11, wherein the pre-mapping parameter domain of one network address translation rule overlaps the post-mapping parameter domain of another network address translation rule.

* * * * *